United States Patent
Jang

(10) Patent No.: US 12,199,460 B2
(45) Date of Patent: Jan. 14, 2025

(54) ESS CHARGING/DISCHARGING SCHEDULE MANAGEMENT DEVICE

(71) Applicant: SYNERGY INC., Ulsan (KR)

(72) Inventor: Kwun Young Jang, Suwon-si (KR)

(73) Assignee: SYNERGY INC., Ulsan (KR)

( * ) Notice: Subject to any disclaimer, the term of this patent is extended or adjusted under 35 U.S.C. 154(b) by 454 days.

(21) Appl. No.: 17/554,855

(22) Filed: Dec. 17, 2021

(65) Prior Publication Data

US 2022/0109315 A1 Apr. 7, 2022

Related U.S. Application Data

(63) Continuation-in-part of application No. PCT/KR2021/000774, filed on Jan. 20, 2021.

(30) Foreign Application Priority Data

Mar. 20, 2020 (KR) .................. 10-2020-0034333

(51) Int. Cl.
*H02J 7/00* (2006.01)
*G06Q 50/06* (2012.01)
*H02J 3/00* (2006.01)
*H02J 3/32* (2006.01)

(52) U.S. Cl.
CPC ............ *H02J 7/0047* (2013.01); *G06Q 50/06* (2013.01); *H02J 3/008* (2013.01); *H02J 3/32* (2013.01); *H02J 7/0014* (2013.01)

(58) Field of Classification Search
CPC .......... H02J 7/0047; H02J 7/0014; H02J 3/32; H02J 3/008; G06Q 50/06

USPC ........................................................ 320/132
See application file for complete search history.

(56) References Cited

U.S. PATENT DOCUMENTS

2017/0170668 A1* 6/2017 Hayashizaki ..... H01M 10/4207

FOREIGN PATENT DOCUMENTS

| KR | 10-0808944 | * | 3/2008 |
| KR | 10-0808944 B1 | | 3/2008 |
| KR | 10-2013-0063949 A | | 6/2013 |
| KR | 10-2014-0119342 A | | 10/2014 |
| KR | 10-2017-0025023 | * | 3/2017 |
| KR | 10-2017-0025023 A | | 3/2017 |
| KR | 10-1836439 | * | 3/2018 |
| KR | 10-1836439 B1 | | 3/2018 |
| KR | 10-2018-0044700 | * | 5/2018 |
| KR | 10-2018-0044700 A | | 5/2018 |
| KR | 10-2164212 B1 | | 10/2020 |
| WO | 2013/042475 A1 | | 3/2013 |

* cited by examiner

*Primary Examiner* — Nathaniel R Pelton
(74) *Attorney, Agent, or Firm* — Bridgeway IP Law Group, PLLC; Sang Ho Lee; Hyun Woo Shin

(57) ABSTRACT

Provided is an ESS charging/discharging schedule management device, and in particular, to an ESS charging/discharging schedule management device which maintains the charging/discharging efficiency of an energy storage device and minimizes an equalized discharge amount during a maximum load time period, thereby preventing a decrease in a customer baseline load which is a baseline for power demand response bidding.

14 Claims, 5 Drawing Sheets

FIG. 3

| By time period \ By season | Summer season (June 1 to august 31) | Spring / Autumn season (March 1 to may 31, September 1 to October 31) | Winter season (November 1 to the end of February next year) |
|---|---|---|---|
| Light load time period | 23:00 ~ 09:00 | 23:00 ~ 09:00 | 23:00 ~ 09:00 |
| Medium load time period | 09:00 ~ 10:00<br>12:00 ~ 13:00<br>17:00 ~ 23:00 | 09:00 ~ 10:00<br>12:00 ~ 13:00<br>17:00 ~ 23:00 | 09:00 ~ 10:00<br>12:00 ~ 17:00<br>20:00 ~ 22:00 |
| Maximum load time period | 10:00 ~ 12:00<br>13:00 ~ 17:00 | 10:00 ~ 12:00<br>13:00 ~ 17:00 | 10:00 ~ 12:00<br>13:00 ~ 20:00<br>22:00 ~ 23:00 |

FIG. 4

| Division | Light Load | | | | | | | | Medium Load | Maximum Load | | Medium Load | Maximum Load | | | | Medium Load | | | | | | Light Load | | Total Charge Amount | Total Discharge Amount |
|---|---|---|---|---|---|---|---|---|---|---|---|---|---|---|---|---|---|---|---|---|---|---|---|---|---|---|
| Time Period | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | | |
| Monday | 1.0 | 1.0 | 1.0 | 1.0 | 1.0 | 1.0 | 1.0 | 1.0 | | 0.8 | 1.4 | | 1.4 | 1.4 | 1.4 | 0.8 | | | | | | | 1.0 | 1.0 | 10.0 | 10.0 |
| Tuesday | 1.0 | 1.0 | 1.0 | 1.0 | 1.0 | 1.0 | 1.0 | 1.0 | | 1.4 | 1.6 | | 1.4 | 1.4 | 1.4 | 1.4 | | | | | | | 1.0 | 1.0 | 10.0 | 10.0 |
| Wednesday | 1.0 | 1.0 | 1.0 | 1.0 | 1.0 | 1.0 | 1.0 | 1.0 | | 1.4 | 1.4 | | 1.6 | 1.4 | 1.4 | 1.4 | | | | | | | 1.0 | 1.0 | 10.0 | 10.0 |
| Thursday | 1.0 | 1.0 | 1.0 | 1.0 | 1.0 | 1.0 | 1.0 | 1.0 | | 1.4 | 1.4 | | 1.4 | 1.6 | 1.4 | 1.4 | | | | | | | 1.0 | 1.0 | 10.0 | 10.0 |
| Friday | 1.0 | 1.0 | 1.0 | 1.0 | 1.0 | 1.0 | 1.0 | 1.0 | | 1.4 | 1.4 | | 1.4 | 1.4 | 1.6 | 1.4 | | | | | | | 1.0 | 1.0 | 10.0 | 10.0 |

FIG. 5

| Division | Light Load | | | | | | | | Medium Load | Maximum Load | | Medium Load | | | | | | Maximum Load | | Medium Load | | Maximum Load | Light Load | | Total Charge Amount | Total Discharge Amount |
|---|---|---|---|---|---|---|---|---|---|---|---|---|---|---|---|---|---|---|---|---|---|---|---|---|---|---|
| Time Period | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | | |
| Monday | 1.0 | 1.0 | 1.0 | 1.0 | 1.0 | 1.0 | 1.0 | 1.0 | | 1.4 | 1.4 | | | | | | 1.4 | 1.4 | 1.4 | | | 1.4 | 1.0 | 1.0 | 10.0 | 10.0 |
| Tuesday | 1.0 | 1.0 | 1.0 | 1.0 | 1.0 | 1.0 | 1.0 | 1.0 | | 1.4 | 1.4 | | | | | | 1.4 | 1.4 | 1.4 | | | 0.8 | 1.0 | 1.0 | 10.0 | 10.0 |
| Wednesday | 1.0 | 1.0 | 1.0 | 1.0 | 1.0 | 1.0 | 1.0 | 1.0 | | 1.4 | 1.4 | | | | | | 1.6 | 1.4 | 1.4 | | | 1.4 | 1.0 | 1.0 | 10.0 | 10.0 |
| Thursday | 1.0 | 1.0 | 1.0 | 1.0 | 1.0 | 1.0 | 1.0 | 1.0 | | 1.4 | 1.4 | | | | | | 1.4 | 1.6 | 1.6 | | | 1.4 | 1.0 | 1.0 | 10.0 | 10.0 |
| Friday | 1.0 | 1.0 | 1.0 | 1.0 | 1.0 | 1.0 | 1.0 | 1.0 | | 1.4 | 1.4 | | | | | | 1.4 | 1.4 | 1.4 | | | 1.4 | 1.0 | 1.0 | 10.0 | 10.0 |

ESS CHARGING/DISCHARGING SCHEDULE MANAGEMENT DEVICE

CROSS-REFERENCE TO RELATED APPLICATIONS

This application is a continuation-in-part of international application No. PCT/KR2021/000774, filed Jan. 20, 2021, and claims priority to Korean patent application No. 10-2020-0034333, filed Mar. 20, 2020, the entire disclosures of which are incorporated herein by references.

TECHNICAL FIELD

The present disclosure relates to an energy storage system (ESS) charging/discharging schedule management device, and more particularly, to an energy storage system (ESS) charging/discharging schedule management device that is capable of preventing a decrease in a customer baseline load, which is a baseline for power demand response bidding, by minimizing an equalized discharge amount during a maximum load time period while maintaining charging/discharging efficiency of an ESS.

BACKGROUND ART

In modern society, electric power is used as an important means to improve the quality of life. Therefore, various measures are established and supplemented in relation to the production and consumption of electric power.

One of the measures is power demand response. This system is a system in which customer sides (participating customers) such as factories or facilities reduce power as much as agreed and receive the agreed amount when a power exchange requests the consumer sides to reduce power in preparation for power shortage or instability.

By controlling a peak power demand through this system, it is possible to eliminate supply shortage during a peak time period of power consumption and provide the same effect at a much lower cost compared to the construction of a new power plant.

Accordingly, the power demand response system as illustrated in FIG. 1 calculates a customer baseline load (CBL) using a max(4/5) calculation method based on the time period of a request for demand reduction according to power demand response bidding.

In addition, since the power consumption that can be reduced is determined based on the customer baseline load, in order to calculate the reduction amount to be high, it is necessary to prevent the customer baseline load, which is the baseline, from being lowered. However, a method of preventing a customer baseline load from being lowered has not been currently provided so far.

DISCLOSURE

Technical Problem

The present disclosure is directed to providing an energy storage system (ESS) charging/discharging schedule management device that is capable of preventing a decrease in a customer baseline load, which is a baseline for power demand response bidding, by minimizing an equalized discharge amount during a maximum load time period while maintaining charging/discharging efficiency of an ESS.

Technical Solution

One aspect of the present disclosure provides an energy storage system (ESS) charging/discharging schedule management device including: a load amount data storage unit configured to provide information on a maximum load, a medium load, and a light load through statistical data on power consumption of a consumer by season and time period; a power control unit configured to control charging/discharging of an ESS by time period of the maximum load, the medium load, and the light load; a demand response (DR) participation capacity calculation unit configured to calculate a DR participation capacity in a total discharge capacity of the ESS; a scheduler configured to manage a customer baseline load (CBL) calculation period including power consumption for the most recent five days on weekdays from a power demand response participation bidding date; and a CBL management unit configured to determine a discharge amount of the ESS so that the power demand response participation capacity is divided and discharged at different times on weekdays in a week managed by the scheduler.

The DR participation capacity calculation unit may calculate an equalized discharge amount that equally distributes the discharge amount discharged from the ESS to the power load by time period and may calculate a remaining capacity, excluding the equalized discharge in the total discharge capacity of the ESS, as the power demand response participation capacity.

The scheduler may transmit a charge/discharge command signal to the power control unit to charge the ESS during the light load time period and discharge the ESS during the maximum load time period.

The device may further include a load monitoring unit configured to monitor power consumption of power loads, in which the load monitoring unit may calculate the power consumption used in the power loads and compare the power consumption with baseline consumption determined as an abnormal working day to determine whether a corresponding day is the abnormal working day.

The scheduler may proceed with the power demand response bidding when the power consumption of the power loads is maintained above the baseline consumption of the abnormal working day and may recalculate the power demand response participation capacity when the power consumption of the power loads is less than the baseline consumption on the abnormal working day.

When the scheduler does not receive a feeding instruction by a power demand response trading time period of the day while waiting for a registration and reduction test or waiting to participate in peak demand power demand response, the scheduler may discharge the ESS during a first medium load time period when the power demand response trading time period elapses in summer and spring/autumn, and discharge the ESS during a first maximum load time period when the power demand response trading time period elapses in winter.

The CBL management unit may discharge the power demand response participation capacity at the maximum load time period and sequentially proceed with discharging at a later time every time period a first one day elapses from weekdays when the discharge starts according to a power demand response discharge plan.

When the entire maximum load time period may be constituted by a plurality of unit times with one hour as a unit, but the number of unit times (one hour) constituting the maximum load time period is greater than the number of weekdays in the week, the CBL management unit may designate a divided discharge day by the number of days corresponding to a difference between the number of unit times and the number of weekdays in the week and equally divide and discharge the power demand response participation capacity at different time periods on the divided discharge day.

The device may further include: a template database (DB) configured to provide a document template required for the power demand response bidding; and a bid generation unit configured to receive the document template from the template DB and record application details required for the power demand response bidding, in which the scheduler 14 may transmit a bid in an electronic document format generated by the bid generation unit to a bidding agency server through a network.

Advantageous Effects

According to the present disclosure described above, an ESS is charged at a light load and discharged at a maximum load, and at this time period, equalized division discharge is performed. Accordingly, the charging/discharging efficiency of the ESS is maintained.

In particular, according to the present disclosure, by minimizing the equalized discharge amount during the maximum load time period on weekdays, it is possible to maintain a reduction amount of power demand response by preventing a customer baseline load, which is a baseline for power demand response bidding, from being lowered.

DESCRIPTION OF DRAWINGS

FIG. 3 is a maximum load, medium load, and light load classification table applied to the present disclosure.

FIG. 4 is a diagram illustrating a charging/discharging state of an ESS by time period in summer and spring/autumn.

FIG. 5 is a diagram illustrating the charging/discharging state of the ESS by time period in winter.

MODES OF THE INVENTION

Figure 1:
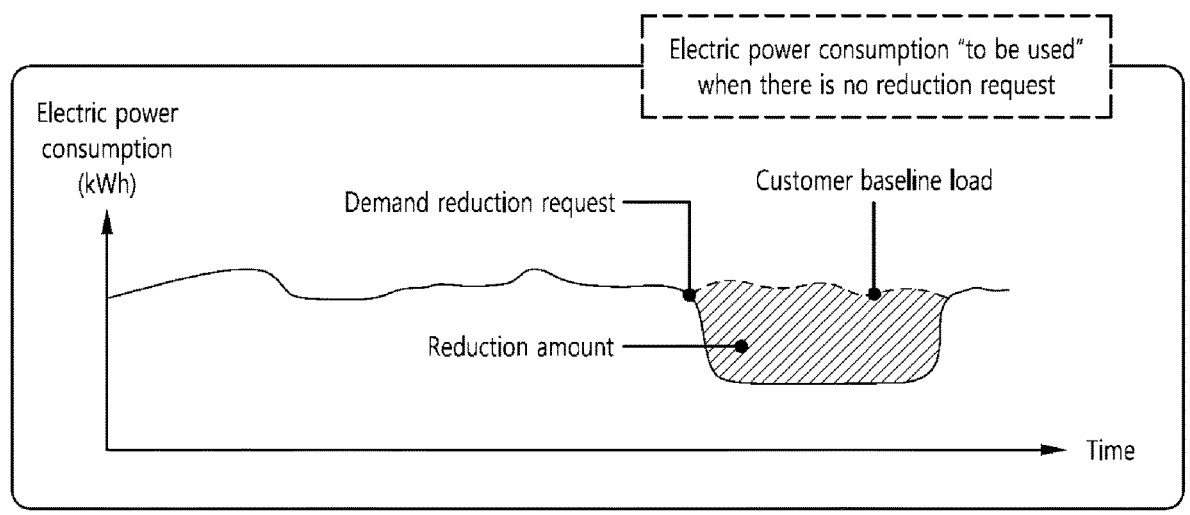
FIG. 1 is a conceptual diagram illustrating a customer baseline load.

Hereinafter, an energy storage system (ESS) charging/discharging schedule management device according to exemplary embodiments of the present disclosure will be described in detail with reference to the accompanying drawings.

The term "unit" is defined herein as having its broadest definition to an ordinary skill in the art to refer to a software including instructions executable in a non-transitory computer readable medium that would perform the associated function when executed, a circuit and/or a processor designed to perform the associated function, a hardware designed to perform the associated function, or a combination of a software, a circuit, or a hardware designed to perform the associated function.

Further, it is to be understood that all detailed descriptions mentioning specific embodiments of the present disclosure as well as principles, aspects, and embodiments of the present disclosure are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, block diagrams of the present specification illustrate a conceptual aspect of an illustrative circuit for embodying a principle of the present disclosure. Therefore, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute software in connection with appropriate software as well as dedicated hardware. When the functions are provided by the processors, they may be provided by a single dedicated processor, a single shared processor, or a plurality of individual processors, and some of them may be shared with each other.

In addition, the explicit use of terms presented as the processor, control, or similar concepts should not be interpreted exclusively by quoting hardware capable of executing software, but should be understood to implicitly include, without limitation, digital signal processor (DSP) hardware, a ROM for storing software, a RAM, and a non-volatile memory. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a method demanded by the claims in the present disclosure defined by the claims, any means capable of providing these functions are equivalent to means recognized from the present specification.

Figure 2:
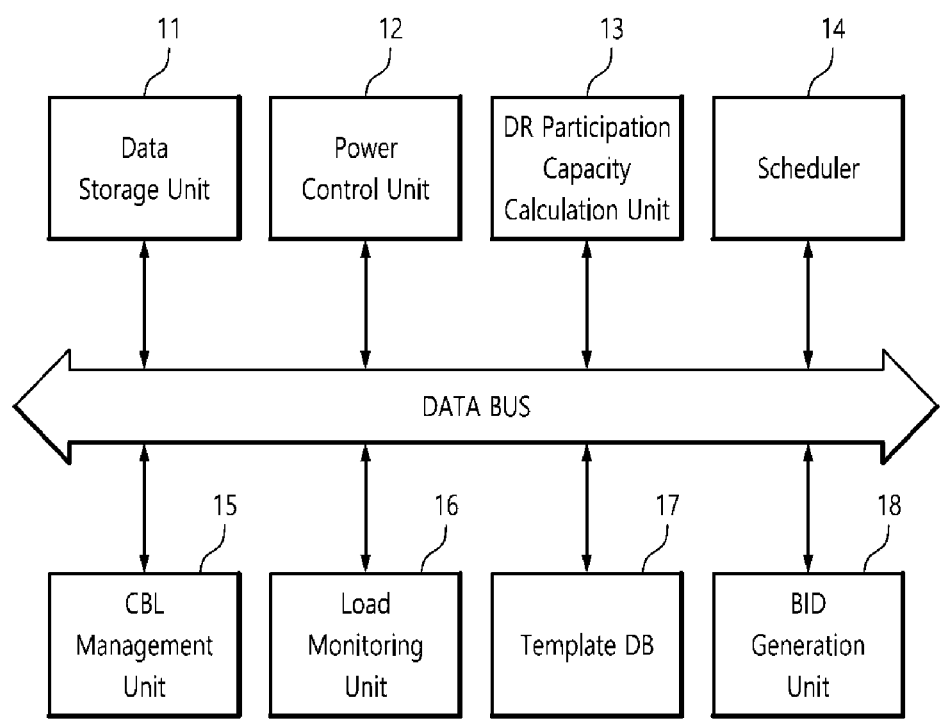
FIG. 2 is a configuration diagram illustrating an energy storage system (ESS) charging/discharging schedule management device according to the present disclosure.

As illustrated in FIG. 2, an ESS charging/discharging schedule management device 10 according to the present disclosure relates to an ESS operation method for optimal participation in power demand response, and maintains charging/discharging efficiency of an ESS. In particular, by minimizing an equalized discharge amount of a maximum load time period, a customer baseline load, which is a baseline for power demand response bidding, is prevented from being lowered.

In this case, the demand response (DR) is also referred to as a "power demand response" and refers to a system in which, when a power exchange requests a reduction in preparation for power shortage or instability, the power demand response customer side saves (reduces) power as much as agreed in advance and receives the agreed amount. In other words, this system is a compensation system for the reduction of power consumption.

Customers participating in the power demand response include various power consumers such as factories, buildings, and large marts, and a customer baseline load (CBL) is a predicted value of power consumption to be used normally when the participating customers do not reduce their power load. This means a load that is a baseline for a power demand reduction in the corresponding time period.

To this end, the ESS charging/discharging schedule management device 10 according to the present disclosure includes a load amount data storage unit 11, a power control unit 12, a DR participation capacity calculation unit 13, a scheduler 14, and a CBL management unit 15. Further, according to another embodiment, the ESS charging/discharging schedule management device 10 may further include a load monitoring unit 16, a template database (DB) 17, and a bid generation unit 18, and the like.

The technical configurations of the present disclosure may be implemented in a computing device that includes various wired and wireless terminal devices, including a server personal computer (PC) including a central processing unit (CPU), a program memory, a database, a network communication module, and the like, and some configurations are provided in an external third terminal and may be linked to each other.

Here, the load amount data storage unit 11 collects or refers to statistical data on power consumption of consumers by season and time period, and stores information on maximum load, medium load, and light load time periods, and stores the stored information in the power control unit 12 and the like.

The power consumption may be slightly different for each country, and as illustrated in FIG. 3, statistical samples of maximum load, medium load, and light load calculations are obtained from an average value for all consumers managed by the Korea Power Exchange.

In addition, the power load is divided into summer and spring/autumn, and other winter seasons according to the power load by season, and by classifying the divided seasonal power load according to time period again, the power load is divided into a maximum load, a medium load, and a light load by season and time period.

The power control unit 12 is also referred to as a power control system (PCS) and controls charging/discharging of an ESS. To this end, the power control unit 12 receives power from the ESS and charges the battery (storage battery).

In addition, the power control unit 12 is a system that converts characteristics (for example, frequency, voltage, and alternating current/direct current (AC/DC)) of electric power for grid discharge, and due to this limitation, a maximum discharge amount per hour is, for example, 30% of ESS capacity.

In particular, the power control unit 12 controls charging or discharging by time period of the maximum load, medium load, and light load. That is, the necessity or efficiency of charging or discharging varies according to the power load by season and time period and, therefore, is controlled by the scheduler 14 and the like.

The DR participation capacity calculation unit 13 calculates power demand response participation capacity in a total discharge capacity (total battery capacity) of the ESS, which means the remainder excluding an equalized discharge amount equally discharged to the power load in the total discharge capacity.

To this end, the DR participation capacity calculation unit 13 first calculates the equalized discharge amount in which the discharge amount discharged from the ESS to the power load is equally distributed by time period. Thereafter, the remaining capacity excluding the equalized discharge amount in the total discharge capacity of the ESS is calculated as the power demand response participation capacity.

As illustrated in FIGS. 4 and 5, when it is assumed that the total capacity of the ESS is 10M, the maximum charging capacity is 10M, the maximum discharge capacity is also 10M accordingly, and the maximum discharge capacity per hour is 30% of the ESS capacity, and thus, becomes 3M.

In addition, the equalized discharge amount is the amount of power discharged from the ESS provided in the power exchange during a maximum load time when an electric power rate of the power exchange is expensive, and is equal to, for example, 1.4M by time period, and the remaining 1.6M (10M−6H×1.4M) corresponds to the power demand response participation capacity.

The scheduler 14 manages a discharge schedule of the ESS, and in particular, manages a calculation period of the customer baseline load. The calculation period for customer baseline load is the most recent five days from a power demand response participation bidding date.

Specifically, a method of calculating a customer baseline load uses a max(4/5) method, which is calculated as an average value of four days excluding a day with the greatest power consumption from among the most recent five days on weekdays, and calculates the average value by time period.

Accordingly, when receiving the power demand response participation bidding, the scheduler 14 manages the calculation period by time period for the previous five days on weekdays thereafter and provides the schedule to the CBL management unit 15 to be described later.

However, the scheduler 14 may transmit a charge/discharge command signal to the power control unit 12 to charge the ESS during the light load time period and discharge the ESS during the maximum load time period.

The light load time period is a time period when the electric power rate is inexpensive, and the ESS is charged during the time period. On the other hand, since the electric power rate is expensive during the maximum load time period, there is an effect of discharging the ESS to obtain a profit.

In addition, when the scheduler 14 does not receive a feeding instruction by the power demand response trading time period (for example, 10:00 to 20:00) of the day while waiting for registration and reduction test or waiting for the peak demand power demand response participation, the discharge is made as follows.

For example, in summer and spring/autumn, the ESS is discharged at the first medium load time period when the power demand response trading time period elapses, and in winter, the ESS is discharged at the first maximum load time period when the power demand response trading time period elapses.

In summer and spring/autumn, since there is no maximum load time period, which is the most expensive electric power rate, after 20:00, which is a closing time of a trading time period, the discharge is performed during the medium load time period instead, and in winter, since there is a maximum load time period after 20:00, the discharge is performed during the time after 20:00, thereby maximizing the discharge benefit.

The CBL management unit 15 prevents the customer baseline load, which is the baseline for determining the reduction amount of the power demand response participating customers, from being lowered and determines the discharge amount of the ESS on weekdays in a week managed by the scheduler 14.

In particular, since the method of calculating a customer baseline load in the present disclosure applies the max(4/5) method described above, the CBL management unit 15 determines the discharge amount of the ESS so that the power demand response participation capacity at different times on weekdays is divided and discharged.

As shown in the following <Equation>, the supply-side power consumption measured by a meter such as a meter from Korea Electric Power™ is defined as a value excluding the discharge amount of the ESS from the load-side power consumption of the consumer.

Supply-side power consumption=Load-side power consumption−ESS discharge amount <Equation>

In this case, since the power consumption (electric power consumption), which is the baseline for calculating the customer baseline load, means the supply-side power consumption, as the discharge amount of the ESS increases, the supply-side power consumption decreases and the customer baseline load also decreases. That is, as the average discharge amount of the ESS increases, the customer baseline load decreases.

Therefore, according to the present disclosure, when the power demand response participation capacity is divided and discharged at different times on weekdays in a week during the customer baseline load calculation period, the average discharge amount of the ESS by time period of four days, except for one day with the greatest discharge among five days, decreases, and on the contrary, the customer baseline load increases, so it is possible to prevent the customer baseline load from decreasing.

FIGS. 4 and 5 illustrate a time period table to which the method of calculating a customer baseline load is applied. FIG. 4 illustrates the ESS charging/discharging state by each time period in summer and spring/autumn, and FIG. 5 illustrates the ESS charging/discharging state by each time period in winter.

As illustrated, the present disclosure controls the ESS so that the power demand response participation capacity is divided and discharged at different times on weekdays in response to the method of calculating a customer baseline load which is the max(4/5) method.

For example, the CBL management unit 15 discharges the power demand response participation capacity during the maximum load time period but sequentially performs discharging at a later time every time period one day passes from a first weekday starting discharging according to the power demand response discharge plan.

That is, since the discharge is executed only during the maximum load time period when an electric power rate is expensive, in FIG. 4, the discharge is executed stepwise like 10:00, 11:00, 13:00, 14:00, and 15:00, and in FIG. 5, the discharge is made stepwise like 10:00, 11:00, 17:00, 18:00, 19:00, and 20:00.

Unlike what is illustrated, when the power demand response participation capacity is discharged at the same time period of 10:00 for two days, Monday and Tuesday, among weekdays, the discharge amount is 2.2M (1.4+0.8) on Monday, the discharge amount is 3.0M (1.4+1.6) on Tuesday, and the discharge amount is 1.4M on each of the rest Wednesday, Thursday, and Friday.

Therefore, except for Tuesday with the greatest discharge, the average discharge value of four days of Monday, Wednesday, Thursday, and Friday is 1.6M ((2.2+1.4+1.4+1.4)/4), and when all the power demand response participation capacities are divided (1.4M) at different times, the average discharge value of the ESS increases.

The increase in the average discharge value of an ESS means using the ESS instead of using power supplied by Korea Electric Power, etc., and thus the supply-side power consumption decreases and the CBL decreases.

Therefore, it can be seen that controlling the customer baseline load is advantageous to the ESS, and thus the power demand response participation capacity is divided and discharged at different times during weekdays of a week as in the present disclosure.

However, the entire maximum load time period is constituted by a plurality of unit times with one hour (1 H) as a unit. For example, although there is a slight difference in time period zones in FIGS. 4 and 5, in both summer and winter, the maximum load is 6 hours (six unit times). Therefore, there may be a case in which it is not possible to distribute and allocate the power demand response participation capacity in six unit times for five days including Monday, Tuesday, Wednesday, Thursday, and Friday, which are weekdays of a week.

As such, when the number of unit times (one hour) constituting the maximum load time period is greater than the number of weekdays of a week, the CBL management unit 15 designates divided discharge days by the number of days corresponding to the difference between the number of unit times and the number of weekdays in a week. In addition, the power demand response participation capacity is equally divided and discharged at different time periods on the designated divided discharge day.

For example, performing discharging at 10:00 and 16:00 by dividing 1.6M into two 0.8M on Monday as illustrated in FIGS. 4 and 5, it is possible to prevent discharging from overlapping at the same time period while performing the discharging only during the maximum load time period.

Meanwhile, the load monitoring unit 16 monitors power consumption of power loads receiving power from the ESS and calculates power consumption used in the power loads. In addition, it is determined whether the corresponding day is an abnormal working day by comparing the power consumption with baseline consumption determined as an abnormal working day.

The abnormal working day refers to a day when a value obtained by calculating the average power consumption for the corresponding demand reduction request reduction time period of the maximum reference day (10 or 20 days) is less than 75% of the average power consumption, which is excluded from the calculation of the reference date.

That is, the day when the power consumption decreases by 75% or more of usual corresponds to an abnormal working day, not weekdays or weekends (weekends are already excluded), and therefore, is excluded from the calculation of the CBL.

Therefore, when the power consumption of the power load is maintained at the baseline consumption or more of the abnormal working day, the scheduler 14 proceeds with the power demand response bidding, and upon successful bidding, it is possible to additionally receive a reduction settlement amount according to the contents of the successful bid. Even when there is failure in bidding, the economical operation of the existing CBL, which prevents the decrease in the customer baseline load, is continuously maintained.

On the other hand, when the power consumption of the power load is less than the baseline consumption of the abnormal working day, it is excluded from the calculation of the customer baseline load because the corresponding day is the abnormal working day, so the power demand response participation capacity may be freely recalculated and applied.

In this case, the discharge is preferably divided into two hours a day, and the discharge uses the time planned to participate in the power demand response according to the scheduling table of the previous day (abnormal working day).

For example, when Tuesday is an abnormal working day, the power demand response participation takes place on Wednesday, but additional bidding is possible once more at 11:00, which is the power demand response participation time of the previous day (Tuesday).

Of course, when Tuesday is an abnormal working day, the discharge does not have to be performed every two hours, and the discharge can be performed on Thursday, Friday, or even on Monday of the following week.

Meanwhile, the template DB 17 and bid generation unit 18, which are omitted from the description above, are provided as needed, and the template DB 17 provides a document template necessary for the power demand response bidding, and the bid generation unit receives the document template from the template DB 17 and records applications required for power demand response bidding.

Accordingly, the scheduler 14 transmits a bid in the form of an electronic document generated by the bid generation unit 18 to a bidding agency server such as Korea Electric Power or a power agency through the network, thereby automatically performing the power demand response bidding according to a fixed schedule.

Hereinabove, specific embodiments of the present disclosure have been described above. However, the spirit and scope of the present disclosure are not limited to these specific embodiments, but it will be understood by those of ordinary skill in the art to which the present disclosure pertains that various modifications and variations are possible within the scope that does not change the gist of the present disclosure.

Accordingly, since the embodiments described above are provided to fully inform those of ordinary skill in the art to which the present disclosure pertains of the scope of the disclosure, it is to be understood in all respects as illustrative and not restrictive, and the disclosure will be defined only by the scope of the claims.

The invention claimed is:

1. An energy storage system (ESS) charging/discharging schedule management device, comprising:
   a load amount data storage unit configured to provide information on a power load including a maximum load, a medium load, and a light load through statistical data on power consumption of a consumer by season and time period;
   a power control unit configured to control charging and discharging of an ESS by each time period of the maximum lead, the medium load, and the light load;
   a demand response (DR) participation capacity calculation unit configured to calculate a power demand response participation capacity in a total discharge capacity of the ESS;
   a scheduler configured to manage a customer baseline load (CBL) calculation period including the power consumption for a most recent five weekdays from a power demand response participation bidding date; and
   a CBL management unit configured to determine a discharge amount of the ESS so that the power demand response participation capacity is divided and discharged at different times on weekdays of a week managed by the scheduler;
   wherein the CBL management unit discharges the power demand response participation capacity at a time period of the maximum load, and
   sequentially performs discharging at a later time as each day passes after a first weekday when the discharge starts according to a power demand response discharge plan.

2. The device of claim 1, wherein the DR participation capacity calculation unit calculates an equalized discharge amount that equally distributes the discharge amount discharged from the ESS to the power load for the each time period, and calculates a remaining capacity, excluding the equalized discharge in the total discharge capacity of the ESS, as the power demand response participation capacity.

3. The device of claim 1, wherein the scheduler transmits a charge/discharge command signal to the power control unit to charge the ESS during a time period of the light load and discharge the ESS during a time period of the maximum load.

4. The device of claim 1, further comprising a load monitoring unit configured to monitor the power consumption of the power load, wherein the load monitoring unit calculates the power consumption used in the power load and compares the power consumption with baseline consumption determined as an abnormal working day to determine whether a corresponding day is the abnormal working day.

5. The device of claim 4, wherein the scheduler proceeds with a power demand response bidding when the power consumption of the power load is maintained at the baseline consumption or more of the abnormal working day, and recalculates the power demand response participation capacity when the power consumption of the power load is less than the baseline consumption of the abnormal working day.

6. The device of claim 1, wherein when the scheduler does not receive a feeding instruction by a power demand response trading time period of a day while waiting for a registration and reduction test or waiting to participate in a peak demand power demand response,
   the scheduler discharges the ESS during a first medium load time period when the power demand response trading time period elapses in summer and spring/autumn, and
   discharges the ESS during a first maximum load time period when the power demand response trading time period elapses in winter.

7. The device of claim 1, wherein the time period of the maximum load is constituted by a plurality of unit times with one hour as a unit,
   and when a number of unit times (one hour) constituting the time period of the maximum load is greater than a number of weekdays in the week, and
   equally divides and discharges the power demand response participation capacity at different time periods on the divided discharge day.

8. The device of any one of claim 1, further comprising:
   a template database (DB) configured to provide a document template required for a power demand response bidding; and
   a bid generation unit configured to receive the document template from the template DB and record application details required for the power demand response bidding,
   wherein the scheduler transmits a bid in an electronic document format generated by the bid generation unit to a bidding agency server through a network.

9. An energy storage system (ESS) charging/discharging schedule management device, comprising:
   a load amount data storage unit configured to provide information on a power load including a maximum load, a medium load, and a light load through statistical data on power consumption of a consumer by season and time period;

a power control unit configured to control charging and discharging of an ESS by each time period of the maximum load, the medium load, and the light load;

a demand response (DR) participation capacity calculation unit configured to calculate a power demand response participation capacity in a total discharge capacity of the ESS;

a scheduler configured to manage a customer baseline load (CBL) calculation period including the power consumption for a most recent five weekdays from a power demand response participation bidding date;

a CBL management unit configured to determine a discharge amount of the ESS so that the power demand response participation capacity is divided and discharged at different times on weekdays of a week managed by the scheduler; and a load monitoring unit configured to monitor the power consumption of the power load, wherein the load monitoring unit calculates the power consumption used in the power load and compares the power consumption with baseline consumption determined as an abnormal working day to determine whether a corresponding day is the abnormal working day, and wherein the scheduler proceeds with a power demand response bidding when the power consumption of the power load is maintained at the baseline consumption or more of the abnormal working day, and recalculates the power demand response participation capacity when the power consumption of the power load is less than the baseline consumption of the abnormal working day.

10. The device of claim 9, wherein the DR participation capacity calculation unit calculates an equalized discharge amount that equally distributes the discharge amount discharged from the ESS to the power load for the each time period, and calculates a remaining capacity, excluding the equalized discharge in the total discharge capacity of the ESS, as the power demand response participation capacity.

11. The device of claim 9, wherein the scheduler transmits a charge/discharge command signal to the power control unit to charge the ESS during a time period of the light load and discharge the ESS during a time period of the maximum load.

12. The device of claim 9, wherein, when the scheduler does not receive a feeding instruction by a power demand response trading time period of a day while waiting for a registration and reduction test or waiting to participate in a peak demand power demand response, the scheduler discharges the ESS during a first medium load time period when the power demand response trading time period elapses in summer and spring/autumn, and discharges the ESS during a first maximum load time period when the power demand response trading time period elapses in winter.

13. The device of claim 9, wherein the CBL management unit discharges the power demand response participation capacity at a time period of the maximum load, and sequentially performs discharging at a later time as each day passes after a first weekday when the discharge starts according to a power demand response discharge plan, and wherein the time period of the maximum load is constituted by a plurality of unit times with one hour as a unit, and when a number of unit times (one hour) constituting the time period of the maximum load is greater than a number of weekdays in the week, the CBL management unit designates a divided discharge day by a number of days corresponding to a difference between the number of unit times and the number of weekdays in the week, and equally divides and discharges the power demand response participation capacity at different time periods on the divided discharge day.

14. The device of any one of claim 9, further comprising:

a template database (DB) configured to provide a document template required for a power demand response bidding; and a bid generation unit configured to receive the document template from the template DB and record application details required for the power demand response bidding, wherein the scheduler transmits a bid in an electronic document format generated by the bid generation unit to a bidding agency server through a network.

* * * * *